United States Patent [19]

Ranson

[11] E Patent Number: Re. 33,084

[45] Reissued Date of Patent: Oct. 10, 1989

[54] INTERMITTENTLY OPERATING PNEUMATIC DEVICE FOR PUMPING SOLID-CARRYING LIQUIDS AND SLURRIES

[76] Inventor: Jean-Francois Ranson, 23 cite Leferrer, 62970 Courcelles-les-Lens, France

[21] Appl. No.: 247,171

[22] Filed: Sep. 21, 1988

Related U.S. Patent Documents

Reissue of:

[64] Patent No.: 4,684,295
Issued: Aug. 4, 1987
Appl. No.: 797,644
Filed: Nov. 13, 1985

[51] Int. Cl.[4] ..... B65G 53/30

[52] U.S. Cl. ..... 406/50; 406/93; 417/137

[58] Field of Search ..... 406/50, 60, 93–96, 406/98, 192; 417/118; 285/363, 405

[56] References Cited

U.S. PATENT DOCUMENTS

| | | | |
|---|---|---|---|
| 2,141,920 | 12/1938 | Lenhart | 406/30 |
| 2,299,470 | 10/1942 | Davis | 406/30 |
| 4,009,912 | 3/1977 | Mraz | 406/153 X |
| 4,079,746 | 3/1978 | Killian | 285/363 X |
| 4,521,165 | 6/1985 | Handleman | 406/50 X |
| 4,684,295 | 8/1987 | Ranson | 406/50 |

FOREIGN PATENT DOCUMENTS

| | | | |
|---|---|---|---|
| 225416 | 6/1987 | European Pat. Off. | 406/42 |
| 255849 | 1/1913 | Fed. Rep. of Germany . | |
| 503984 | 7/1930 | Fed. Rep. of Germany | 406/94 |
| 2406589 | 5/1979 | France . | |

*Primary Examiner*—Joseph F. Peters, Jr.
*Assistant Examiner*—James M. Kannofsky
*Attorney, Agent, or Firm*—Bierman and Muserlian

[57] ABSTRACT

The pneumatic device for pumping a solid-carrying liquid or slurry, which operates intermittently and is continuously under load, comprises a tubular body (1) in which a flap valve (12) is mounted so that it pivots in the downstream direction on a support (8) and cooperates with a seat to close a passage port (11) at the entry of a pumping chamber (17), between the seat and the delivery port (16). A pipe (18) which allows compressed air to enter opens into the pumping chamber (17). The valve (12) is opened under the pressure of the solid-carrying liquid or slurry to be conveyed, when compressed air is not allowed to enter the chamber (17). The entry of air causes the valve (12) to close and the chamber (17) to empty. A valve (20) which is operated by a timing device (23) controls the filling and emptying sequences. The device is useful for pumping dense slurries and solid-carrying liquids.

7 Claims, 3 Drawing Sheets

INTERMITTENTLY OPERATING PNEUMATIC DEVICE FOR PUMPING SOLID-CARRYING LIQUIDS AND SLURRIES

Matter enclosed in heavy brackets [ ] appears in the original patent but forms no part of this reissue specification; matter printed in italics indicates the additions made by reissue.

The present invention relates to an intermittently operating pneumatic device for pumping slurries or solid-carrying liquids.

More particularly, the subject of the invention is a pumping device, operating intermittently by means of compressed air, which makes it possible to convey solid-carrying liquids, which may be viscous, abrasive or corrosive, such as dense pulps or slurries which are highly abrasive.

The difficulties of conveying solid-carrying liquids such as heterogeneous, abrasive and dense (relative density above 1.6) slurries or pulps, which are encountered in industry and in water treatment plants, are well known. The majority of commercially available pumps for performing these tasks have many disadvantages. All of the existing pumps, known as "slurry pumps", have at least one plunger or at least one component driven in rotation by an electric motor. A lubrication system is usually provided to reduce the friction of the movable component(s) which produces, or produce, a large amount of heat. In addition, the movable components of these pumps wear very rapidly, owing to the abrasion phenomena.

In addition, the normal "slurry pumps" present sealing problems: all these pumps are fitted with packing and a stuffing-box which are a source of leaks and of contamination that develop with time. Some of these pumps, especially those which incorporate diaphragms and floats, have a performance which deteriorates with time and, generally speaking, "slurry pumps" are relatively bulky, are not easy to connect to the associated conveying pipe-work, and cannot be transported readily. Furthermore, during prolonged stoppages in the operation of such pumps, the delivery pipework must be cleaned so as to avoid it being blocked by the settling of the solids which are conveyed. Bearing the above in mind, and since all the known "slurry pumps" are electrically driven and controlled, they are very costly in terms of overhaul and energy consumption. Furthermore, most of the existing "slurry pumps" convey only solid-carrying liquids whose relative density lies within a rather narrow relative density range, generally between 1 and 1.5 and, above a density of 1.5 to 1.6, pumping becomes difficult and the pumps which must then be used are very costly to buy and to maintain, because the slurries must be centrifuged.

Furthermore, a pneumatic device is known, from German Patent No. DE-255,849, for supplying bulk materials, which comprises two identical supply receptacles articulated in the manner of a pendulum mounting at the two ends of an oscillating beam, so that the receptacles are moved, alternately and in opposition, from a high position in which they are filled with a material to be conveyed, to a low position, in which the load of materials is discharged from the receptacles. Each receptacle comprises a tubular body within which a filter cartridge, which retains dust and allows air to pass through, defines a lengthwise chamber having an entry port and a delivery port which open into the upstream and downstream ends of the chamber respectively and which can be closed, by an entry flap valve and a delivery flap valve, respectively. In addition, two lateral pipelines, one of which, upstream, is a suction pipeline connected by a valve to a source of reduced pressure, and the other of which, downstream, is a pressurising pipeline connected by another valve to a compressed air source, open into the annular chamber defined between the filter cartridge and the tubular body of the receptacle.

When a receptacle is empty and in a high position, the compressed air supply to the pressurising pipeline is cut and the delivery valve is closed. The suction pipeline is then connected to the source of reduced pressure, the entry valve opens and the lengthwise chamber in the filter cartridge fills, by suction, with the bulk material which is conveyed up to the entry port by means of flexible tubing. During this phase, the filter cartridge isolates the suction pipeline from the materials drawn into the chamber situated inside the cartridge. After the suction phase and the filling of the chamber inside the filter cartridge, the corresponding receptacle moves down to a low position and the connection between the suction pipeline and the source of reduced pressure is cut. The connection between the pressurising pipework and the compressed air source is then established and compressed air is thus injected into the tubular body. The entry valve is closed and the delivery valve is opened and the charge of material held in the chamber inside the filter cartridge is expelled from the tubular body through the delivery port and driven on through a flexible delivery line.

It is clear that, because of the sequential operating cycle, after the manner of an airlock, which requires filling by suction and emptying by pressurisation, this device must have two flap valves which are required to confine the airlock chamber, and the delivery line downstream of the delivery valve is never completely emptied. In addition, and above all, this device is designed for conveying bulk products, but never solid-carrying liquids or slurries, because it includes a component which is essential for its operation, namely the filter cartridge which isolates the suction and pressurising pipeworks from the materials conveyed and which would be blocked very quickly after several working cycles by the slurries or other charges carried by the liquids conveyed.

For these reasons, investigations have been carried out into a new device intended for pumping solid-carrying liquids and slurries and capable of overcoming the disadvantages of the "slurry pumps" of the state of the art, which have been set out above, while simplifying the structure and restricting, in so far as possible, the number of moving parts, so as to be free from the associated friction, heating, lubrication and wear problems, as well as from the problems related to the means for driving the moving parts.

In particular, another aim of the invention is to offer a device for pumping solid-carrying liquids and slurries which, by virtue of its design, should be flameproof (without an electric motor), perfectly sealed (without a stuffing-box or packing), uniform in performance (without a component such as a diaphragm whose mechanical characteristics deteriorate with time), and which should consume little energy.

Yet another aim of the invention is to offer a device for pumping solid-carrying liquids and slurries which should be small in bulk, easy to transport and to install and very economical in respect of purchase and maintenance costs.

Still another aim of the invention is to offer a pumping device which withstands abrasion, is submersible and is capable of conveying heterogeneous slurries containing solids which may be of a relatively large size.

These aims have been achieved by means of an intermittently operating, pneumatic device for pumping solid-liquids and slurries, which is intended to be under continuous load, either by being immersed in a storage tank of solid-carrying liquids or slurries, or by being connected to this storage tank via pipeline, and which comprises:

- a tubular body defining an inner chamber having an entry port and a delivery port opening into its upstream and downstream ends respectively;
- at least one pipeline for injecting compressed gases, such as air, opening into the inner chamber via at least one pressurisation port;
- a supply valve connected to each injection pipeline and intended to be connected to a compressed gas source to provide a selective supply of compressed gas to each injection pipeline; and
- a supply valve control device;

this device according to the invention being characterised in that it additionally comprises a single flap valve mounted on a fixed support inside the inner chamber, between the entry port and the pressurisation port, and cooperating with a seat inside the body, surrounding a passage port for the solid-carrying liquid and defining, between it and the delivery port, a part of the inner chamber which forms a pumping chamber, the flap valve pivoting, on the one hand, towards the delivery port, in a position for filling the pumping chamber, in the absence of injection of a compressed gas through the pressurisation port and under the pressure of the solid-carrying liquid which tends to enter the pumping chamber through the passage port and, on the other hand, in the opposite direction, towards the seat against which the valve flap is applied in a leakproof manner, in a position for closing the pumping chamber in the upstream direction and discharging in the downstream direction, under the effect of an injection, through the pressurisation port, of compressed gas which drives the volume of solid-carrying liquid present in the pumping chamber out of the latter through the delivery port, the lowest point of the pumping chamber in the region of the flat valve seat being at a level which is at least as high as the level of the highest point of the pumping chamber, and substantially at the level of the delivery port.

The pumping device according to the invention is consequently of a very simple structure, since it includes only one moving part, namely a flap valve which is easy to manufacture. In addition, it makes it possible to ensure a complete discharge of the volume of solid-carrying liquid held in the pumping chamber and in a delivery line which is connected to the body at the delivery port, in order to convey any solid-carrying liquid, dense and/or viscous, or a slurry, into the open air or into a receptacle exposed to the open air. The structure of the device according to the invention, is moreover such that after a stoppage of operation it can be restarted without the risk of blocking the tubular body or the delivery line.

In a particularly simple embodiment, the tubular body consists of the end-to-end mounting of two cylindrical shells (or tube sections), assembled by uniting the two flanges at their adjacent ends, the valve support being held between these and provided with the passage port whose periphery, on the side of the delivery port, forms the valve seat, a single pipeline for injecting compressed gas opening via a single pressurisation port into the top part of the pumping chamber, defined in the downstream shell (or tube section). In this case, it is advantageous to make additional use of shells (or tube sections) each of which has a union flange at each of its axial ends, the upstream flange of this upstream shell and the downstream flange of the downstream shell being intended, for example, for connecting the tubular body to a pipeline supplying the pumping device with solid-carrying liquids and to a delivery line for the solid-carrying liquid, outside the device, respectively.

However, in a preferred embodiment, which makes it possible to obtain major savings in the volume of compressed gas required to purge the pumping chamber and, at least partially, a delivery line, the pumping chamber is defined in the tubular body consisting of an upstream part having the shape of a cylindrical shell, into which a single injection line opens via a single pressurisation port and which is extended downstream by a funnel, substantially in the shape of the frustum of a cone offset downwards.

In this case, the upstream end of the cylindrical shell of the body advantageously has a flange for coupling to a downstream end flange of a filling pipeline which opens into the cylindrical shell and defines the entry port into the body, and the flap valve is carried by the downstream flange of the filling pipeline, while the downstream end of the funnel is extended in the downstream direction by a delivery pipeline which has means for coupling to a delivery line.

When the delivery line is relatively short in length, the port for venting the pumping chamber, and which is necessary to make it easy to fill said pumping chamber, may be defined merely by the downstream end of the delivery line. The compressed gas supply valve may then consist simply of a two-way valve. However, when the delivery line is relatively long, it is preferable for the compressed gas supply valve to be a three-way valve, one of the channels of which permits the pumping chamber to be connected to the open air by means of the injection line, while the delivery port at the downstream end of the delivery line can nevertheless serve as a port for connecting to the open air in an emergency, should the valve fail.

The flap valve may be either of a type which is mounted pivoting as a whole around an axis which is stationary on the support and perpendicular to the flow direction of the solid-carrying liquids in the tubular body, or of a type comprising a movable shutter, intended to be applied to the valve seat in a leakproof manner, an apron for attaching to the support, and a flexible part which connects the shutter to the apron and which constitutes a hinge permitting the pivoting motions of the shutter relative to the apron.

In both cases, the flap valve can include a rigid core made, for example, of metal, which adheres to, or is embedded in, a plate of a rubbery material, enabling the device to operate quietly and ensuring better sealing by bearing on the valve seat.

When the device includes flanges for fixing the constituent parts of the tubular body to each other and/or to the filling and/or delivery pipes and/or lines, it is advantageous, in order to enable the device to be rapidly assembled and disassembled, especially in order to replace the flap valve which constitutes the only part of the device which wears out, that the flanges should have several cavities which open into their periphery and are intended to be arranged facing each other on two adjacent flanges which are to be joined, in order to receive, by pivoting, the threaded rods, carrying nuts which are screwed on, of eyebolts, each of which is mounted pivoting via its eye around a pivot carried by yoke projecting outwards on the component forming the body, the pipe or the tubing which carries one of the two adjacent flanges to be joined, and so that the corresponding nut be can tightened against the other adjacent flange to be joined.

In order to enable the device to operate automatically and independently, the device controlling the compressed gas supply valve advantageously includes a timing device which starts the cycles during which the pumping chamber is filled and drained.

Finally, when the tubular body is connected to a long delivery line at the downstream end, it is advantageous to fit non-return valves in this line at substantially uniform intervals, each of which valves is preferably of the flap valve type with or without a compressed gas injection line which opens via a pressurisation port just downstream of each flap valve, this permitting the solid-carrying liquids to be discharged through a discharge column which is subdivided into consecutive sections, each defined between two successive non-return valves, and while providing major savings in the compressed gas injected into the whole device to provide pumping over a large distance, if appropriate as far as a vessel for receiving the solid-carrying liquids and for relieving the pressure of the compressed gas, and which is constructed as a pressure-release cyclone.

Other advantages and characteristics of the invention will become apparent from the following description, which is not intended to imply any restrictions, of two examples of embodiment which are given with reference to the attached drawings, in which.

Figure 1:
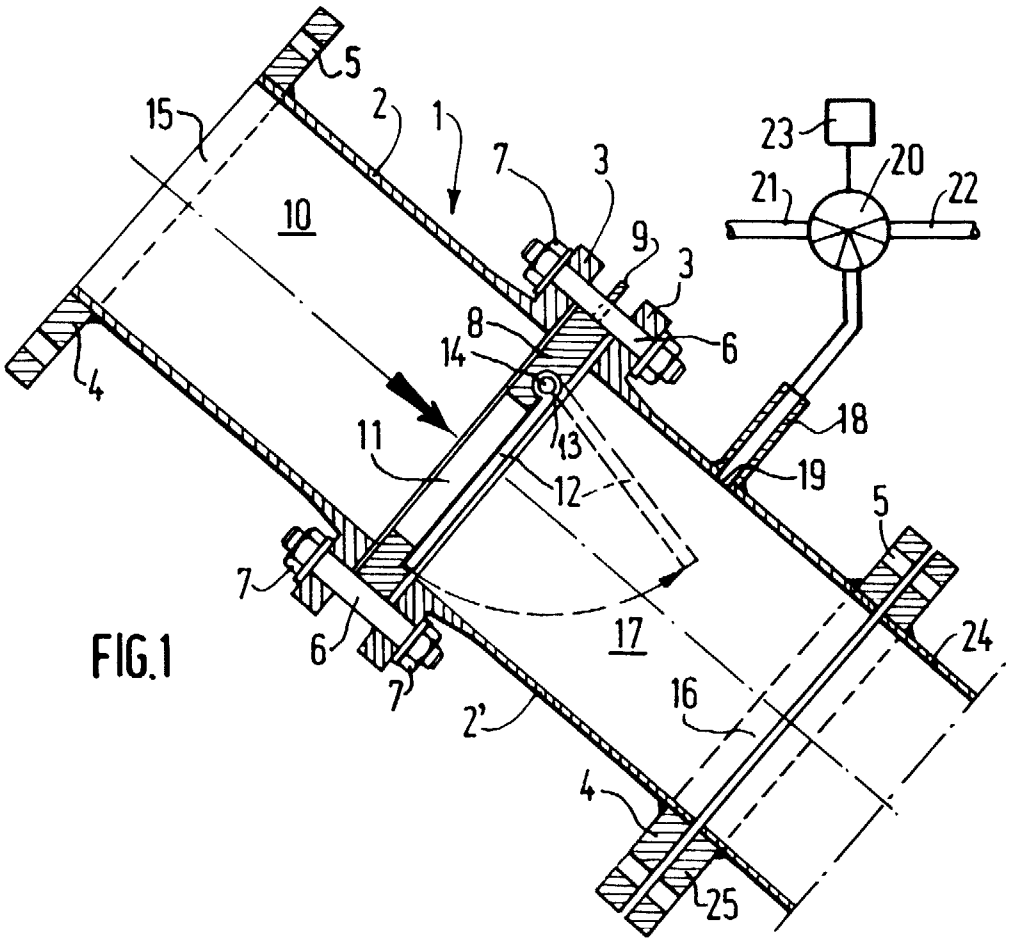
FIG. 1 is a diagrammatic view, in a vertical and axial section, of a first example of embodiment of the pumping device

The device shown in FIG. 1 comprises a tubular body 1, consisting of the end-to-end and coaxial assembly of two cylindrical shells 2, and 2', which are substantially identical but are arranged symmetrically in relation to the transverse plane of connection. At one of its two axial ends, each shell 2 or 2' forms a single component with an external, radial peripheral flange 3 shaped like a forged collar, while another external, radial, peripheral flange 4, shaped like an annular crown, has been added by welding at its other axial end. As a result of the head-to-tail arrangement of the shells 2 and 2', the downstream flange of the upstream shell 2 and the upstream flange of the downstream shell 2' are the two forged collar flanges 3 arranged facing each other, while the upstream flange of the upstream shell 2 and the downstream flange of the downstream shell 2' are the added crown flanges 4. Flanges 3 and 4 are pierced in an axial direction, in the usual way, with holes such as 5 providing passages for bolts such as 6 onto which are screwed nuts such as 7, tightened against the flanges to provide their coupling to each other or to other components. A support 8, in the form of a metal annular disc is held by being clamped between the two flanges 3, which are clamped to each other and against the peripheral parts of the opposite faces of the support 8, which is held in position during the assembly by passing at least some of the bolts 6 through the holes pierced in the outer radial lugs 9 of the support 8. The support 8, which extends transversely in the inner chamber 10, defined in the shells 2 and 2', also has a central and circular passage orifice 11, the passage cross-section of which is substantially smaller than the inner cross-section of the shells 2 and 2'. A flap valve 12 is mounted pivoting as single component on the downstream face of the support 8. This valve 12 is, for example, in the shape of a disc of a larger diameter than the circular orifice 11 and whose upper part is fixed integrally to a sleeve 13 by means of which the valve 12 is mounted pivoting around a horizontal transverse shaft 14, carried by a yoke projecting over the downstream face of the support 8. Valve 12 pivots between the open position of the port 11 (the position shown by broken line in FIG. 1) and in which it is lifted in the downstream direction, and the closed position of port 11 (shown by continuous line in FIG. 1), and in which it is applied, in a leakproof manner, against the seat formed on the downstream face of the support 8 on the periphery of the port 11. This valve 12 is made of metal or, preferably, has a metal core embedded in a rubbery material (natural or synthetic rubber, silicone elastomer, and the like). The upstream and downstream flanges 5 of the body 1 surround, respectively, the entry port 15 and the delivery port 16 of the inner chamber 10, and the valve 12 pivots in the part of the chamber 10, which is defined downstream between the support 8 and the delivery port 16, and which constitutes a pumping chamber 17. A compressed air injection line 18 opens via a pressurisation port 19 into the pumping chamber 17, above the level of the lowest point of this chamber 17, at the base of the valve seat, which is itself above the level of the highest point of the chamber 17, in the immediate vicinity of the delivery port 16, as a result of the downward and upstream-to-downstream slope which is given to the body 1. The pipeline 18 is connected to one channel of a three-way inlet valve 20, another channel of which is connected via the pipeline 21 to a compressed air source and the third channel of which is connected to the open air via the end piece 22. The valve 20 is operated by a control box 23 comprising, in particular, an electrical, electronic or even pneumatic timing mechanism, and controlling the selective connections of the pipeline 18, either with the pipeline 21 to admit compressed air into the pumping chamber 17 or with the end piece 22 to connect the pumping chamber 17 to the open air. The body 1 is connected via the flange 4 of its upstream end to the downstream end of a filling line (not shown) connected to the bottom part of a storage tank for a solid-carrying liquid or of a settler or thickener for the slurry to be pumped. It is also possible, however, for the body 1 to be kept immersed, by means of this upstream flange 4, on the bottom of such a storage tank or settler, so that the device is always under load. The body 1 is connected, by means of the flange 4 at its downstream end, to the flange 25 of the upstream end of a delivery line 24, the downstream end of which opens directly into the open air or into a storage tank in the open air or into a vessel for receiving the slurries or solid-carrying liquids and for relieving the pressure of compressed air, of the pressure-release cyclone type with double walls which prevent the slurry or the liquid from being ejected.

This device operates as follows: at the beginning of a working cycle, the box 23 operates the valve 20 so that the pipeline 18 and the pumping chamber 17 are connected to the open air via the end-piece 22. Since the body 1 is continously under load, by the principle of communicating vessels, the solid-carrying liquid which enters the chamber 10 via the entry port 15 pushes the valve 12 into the open position and fills the pumping chamber 17, while passing through the orifice 11 in the support 8. Next, the box 23 operates the valve 20 so that the pipeline 18 is connected to the compressed air source. Air under an initial pressure of approximately 0.6 MPa is then injected into the pumping chamber 17. Under the effect of this pneumatic pressure, the flap valve 12 is pushed back against its seat on the support 8, into a position which closes the passage orifice 11, thus isolating the pump chamber 17 from the storage tank for the slurry or the solid-carrying liquid which is to be pumped. At the same time, the volume of slurry or of solid-carrying liquid which is present in the pumping chamber 17 and possibly of a certain length in the delivery line 24, is expelled outwards through the delivery channel 24. If the time for which the compressed air is injected is long enough, the chamber 17 and the delivery line 24 are empited and then the box 23 again operates the valve 21 to ensure the connection the pumping chamber 17 to the open air and the cycle recommences.

Depending on the initial pressure of the injected air, the volume of the pumping chamber 17 and the delivery line 24, and consequently on its length, as well as on the discharge head, and on the load pressure in the tubular body 1 and consequently also on the relative density of the solid-carrying liquid to be conveyed, adjustement of the timing mechanism in the control box 23 makes it possible to regulate the filling and emptying sequences of the device, and their frequency.

This pumping device, the body 1 of which is made of coated or uncoated mild steel, stainless steel, metal sheet, an alloy which withstands corrosion by the liquids conveyed, or even of an elastomer, enables a solid-carrying liquid and a dense slurry (with a relative density of 1.3 to 2.2 or even higher) to be pumped at a low rate (from 1 to 10 $m^3$/hour) at discharge heads from 10 to 50 m and discharge distances from 20 to 100 m.

Figure 2:
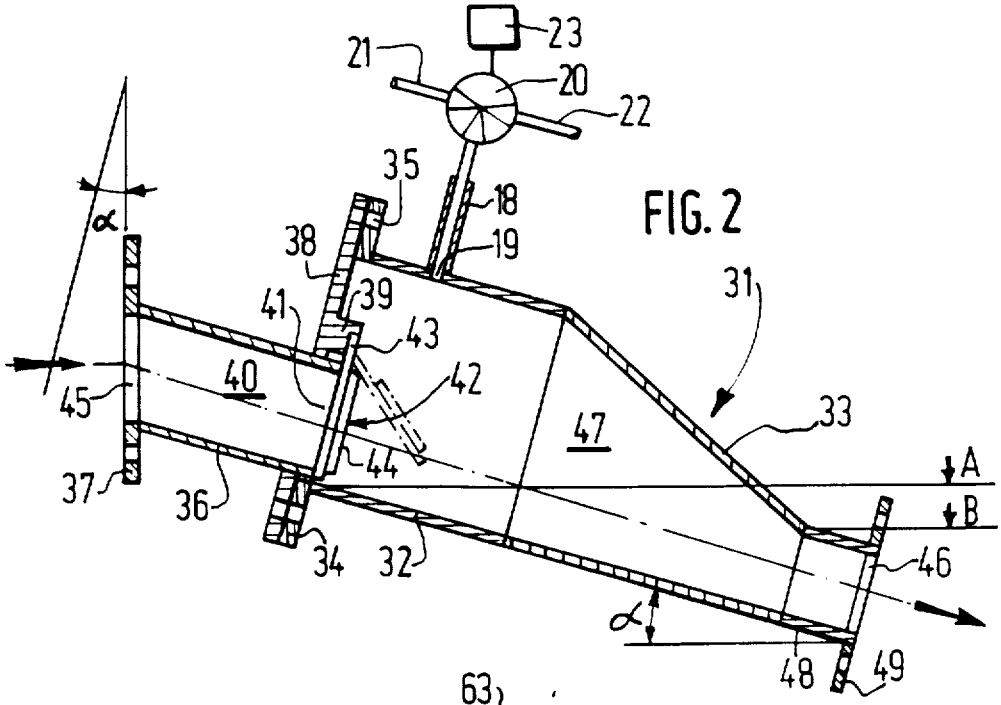
FIG. 2 is a similar view of a second example of embodiment.

The device in FIG. 2, which operates in the same way as that described above with reference to FIG. 1, differs from the latter essentially in that the tubular body 31 consists, in its upstream section, of a cylindrical shell 32 whose downstream end is welded to the upstream, larger cross-section, end of a funnel 33 which forms the downstream section of the body 31. The shape of the funnel 33 is that of the frustum of a cone which is displaced downwards, so that the wall of its lower part forms substantially the extension of the wall of the lower part of the shell 32, parallel to the inclined direction of the body 31, sloping downwards and from upstream towards downstream, so that the level A of the lowest point in the downstream end of the shell 32 is higher than the level B of the highest point in the downstream end of the funnel 33.

In this example, this is obtained when the lower generatrix of the body 31 is inclined at an angle alpha of the order of 15° to the horizontal. This special shape of the body 31, made of a steel sheet 4 mm in thickness, for example, makes it possible to restrict the usage of compressed air entering the body 31 via the pressurisation port 19, through which the injection line 18 opens into the upper part of the shell 32, this line 18 being connected, as in the preceding example, to the three-way valve 20 operated by the box 23 containing the timing mechanism.

At its upstream end, the shell 32 has an annular flange 34, projecting rigidly outwards, attached by welding, and fixed by being bolted, by virtue of the hole 35, to a flange 38 attached by welding around a filling line 36, close to the downstream end of the latter, which opens into the upstream end of the shell 32. At is upstream end, the filling line 36, the slope of which is substantially the same as that of the body 31, is integrally attached to a flange 37, substantially vertical, and consequently inclined at the angle alpha with respect to a transverse plane perpendicular to the axis of the line 36. The flange 37 enables the device to be fixed by bolting directly to the outlet of a storage tank for solid-carrying liquid to be conveyed or to maintain the device in a submerged position in this storage tank, or even to connect it to a substantially horizontal loading line. In this example, the downstream end of the pipeline 36 defines the passage port 41 which may be closed by the flap valve 42. The valve seat is formed by the front face of the downstream end of the pipeline 36 and the valve 42 consists on the one hand, of a rubber plate 43, fixed by its upper part being bolted to a boss 39 projecting over the flange 38 towards the inside of the shell 32, and intended to close the port 41 in a leakproof manner and, on the other hand, of a metal disc 44 glued to the downstream face of the plate 43 in order to stiffen that part of it which forms the shutter proper, so that the rubber plate 43 has a flexible zone between the part covered by the metal disc 44 and the part fixed to the support 39, forming a hinge and permitting the shutter part of the valve 42 to pivot between, on the one hand, the position in which the port 41 is open (shown by broken lines in FIG. 2) under the pressure of the solid-carrying liquid entering the chamber 40 inside the pipeline 36 through the entry port 45 defined by the upstream flange 37, and when the pumping chamber 47, which is defined in the body 31, is connected to the open air via the pipeline 18, the valve 20 and the end-piece 22, and, on the other hand, the position in which the port 41 is tightly closed (shown by continuous lines in FIG. 2) under the pneumatic pressure of the compressed air which is allowed to enter the pumping chamber 47 via the pipeline 18, the valve 20 and the pipeline 21 to empty this chamber 47. The downstream end of the funnel 33 is connected by welding (or by a flange) to the upstream end of a short delivery line 48, the downstream end of which defines the delivery port 46 of the device and is surrounded by a flange 49, attached by welding. This latter flange enables the device to be coupled to a discharge line (not shown). When this discharge line is of a great length, and in order to obtain savings in the usage of compressed air, nonreturn valves may be fitted at uniform intervals, for example every 50 m, along the discharge line. In this way, the discharge column is subdivided into adjacent sections which succeed each other and which are gradually pushed closer together during the phases when the pumping chamber 47 of the device empties, during which the non-return valves are open, the adjacent sections of the discharged column being separated by the non-return valves, on the contrary, when the latter are closed, during the phases when the pumping chamber 47 of the device is filling.

Flap valve devices such as that shown in FIG. 1 may be used as non-return valves, without it being absolutely necessary for them to be given the slope of the device in FIG. 1. In addition, the compressed air injection line 18 of the device in FIG. 1 need not necessarily be used in this application. Compressed air injection slightly downstream of each non-return valve is only justified when the total length of the discharge line and/or the pressure drops in the unit are high. On the other hand, in this case, the connection of the pumping chamber 47 of the device to the open air is necessarily povided by the corresponding valve 20, for the purpose of filling.

In both the examples described above with reference to FIGS. 1 and 2, the connections of the component parts of the tubular body to each other and/or to the filling or discharge pipes or lines, are ensured by fixing flanges which are bolted in pairs by means of bolts passing through the holes pierced facing each other in the flanges.

Figure 4:
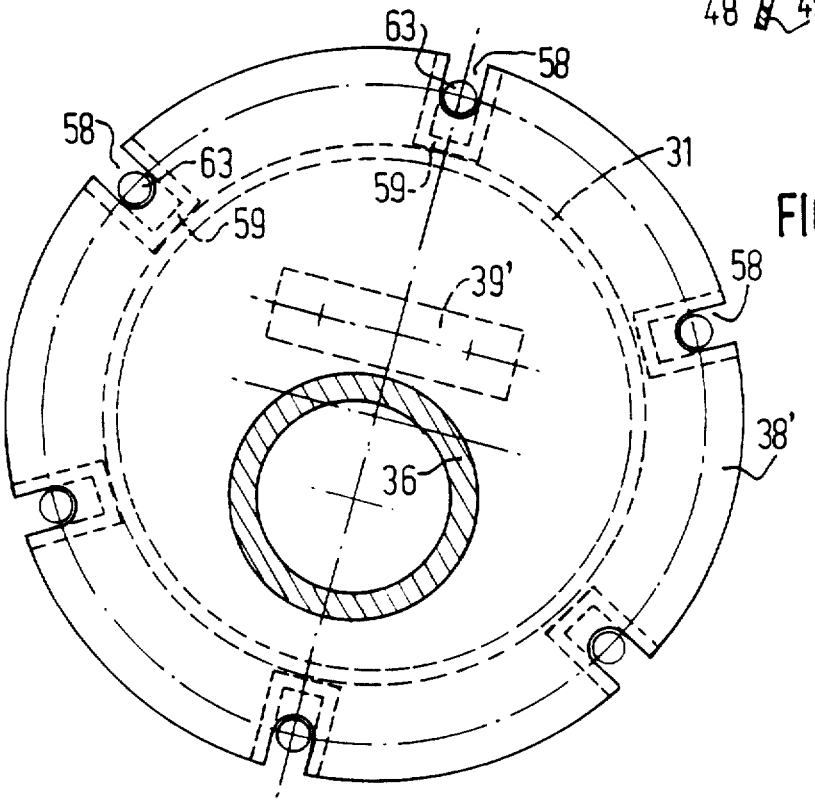
FIG. 4 is a partial, diagrammatic cross-sectional view of the alternative form of FIG. 3.
Figure 3:
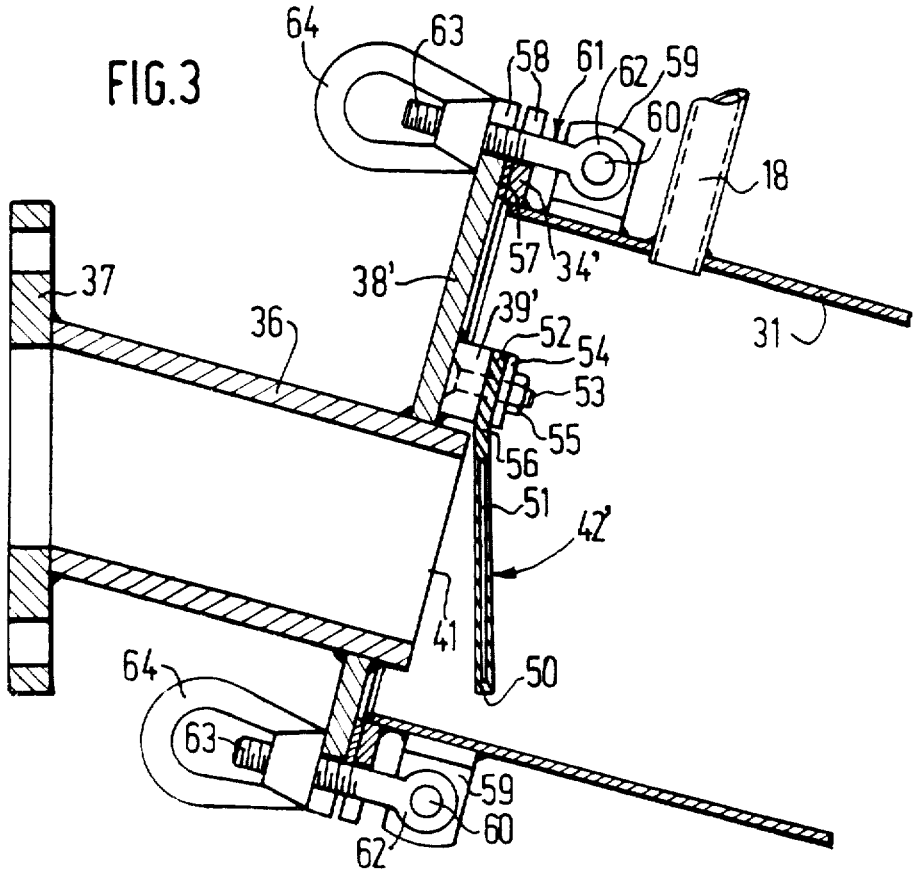
FIG. 3 is a partial view in axial section of an alternative form of the device according to FIG. 2.

In order to enable the device to be assembled and disassembled more quickly, both in respect to these connections to the pipelines and in respect of the flap valve support, especially for replacing the flap valve, which constitutes the only part of the device which can wear and is consumable, it is advantageous to use the flange fixing mechanism which is shown in the alternative embodiment in FIGS. 3 and 4, in the region of the valve-carrier flange.

As in the example of FIG. 2, FIGS. 3 and 4 shown the tubular body shell 32, the compressed air injection line 18, and an upstream flange 34' of the shell 32, together with the filling line 36 with its upstream flange 37 and a downstream flange 38' close to its downstream end which opens into the shell 31 and defines the passage port 41 which can be closed by a flap valve 42'. In this alternative embodiment, the valve 42' comprises a circular rubber disc 50, the diameter of which is slightly larger than that of the circular port 41, and which is stiffened by a metal disc 51 forming a core embedded in the disc 50, which thus forms a shutter. In its upper part, this disc 50 is extended by a rectangular rubber apron 52 which has three holes by means of which it is mounted on the threaded stems of three bolts 53, the heads of which are embedded in the parallelepipedal support 39' welded to the downstream face of the flange 38', and the apron 52 is clamped between the support 39' and a pressure plate 54, under the tightening effect of the nuts 55 on the bolts 53. The portion 56, which is situated between the apron 52 and the disc 50, thus forms a flexible zone acting as a pivot hinge for the flap valve 42'.

The flanges 34' and 38', between which a seal 57 is arranged, each have six round-bottomed radial cavities 58 on their periphery, which open outwards and are distributed uniformly over the periphery. A yoke 59, which opens outwards and whose two arms are separated by the width of the cavity 58 and lie in the extension of the edges of this cavity 58, is welded to the outer face of the shell 31 at a short distance downstream of each cavity 58 of the flange 34'. A transverse shaft 60 extends between the two arms of the yoke 59, and an eyebolt 61 is mounted so that it pivots, via its eye 62 in the yoke 59, around the shaft 60. In addition, an eye nut 64 is screwed onto the end of the threaded stem 63 of the bolt 61. As a result, after the two flanges 34' and 38' have been positioned so that their cavities 58 form pairs of cavities facing each other, the bolts 61 can be swung around the shafts 60 so that each of the stems 63 fits into two facing cavities 58 in the two flanges 34' and 38', and the nuts 64 can then be screwed onto the stems 63 to clamp the flanges 34' and 38' to each other. Conversely, by unscrewing the nuts 64 the two flanges can be disassembled quickly by then swinging the bolts 61 outwards and towards the shell 31, around the shafts 60. The flap valve 42' is thus readily accessible.

The devices according to the invention have the following advantages:

- they constitute positive displacement pumping devices; at each cycle, the compressed air expels a volume of solid-carrying liquid or of slurry which is equal to the total working volume of the pumping chamber and of the delivery line (the working volume of the latter depending only on the pressure head and on its cross-section);
- the hourly throughput is a function of the number of cycles per hour which are called for by the timing mechanism in the control box 23, and this throughput is equal to the number of cycles multiplied by the volume as defined above;
- these pumping devices have only one moving part, the flap view;
- these pumping devices employ compressed air as the working fluid; depending on use conditions, the air pressure can vary between 0.6 and 0.3 MPa:
- control of the throughput and of its changes is straight forward: the timing device in the box 23 operates the three-way valve 20, and determines the frequencies of opening to the atmosphere, the pumping chamber filling time and the compressed air injection time, which determine the hourly throughput of the pumping device;
- the causes of breakdown of this pumping device are limited: they may be a breakdown in compressed air supply or a drop in pressure in the supply system, the jamming of a body between the flap valve and the seat, which does not make it possible to isolate the pumping chamber from the storage tank for the solid-carrying liquid to be pumped, but, in all cases, only a few minutes are required to dismantle the device in order to restore it to the operating condition;
- the pumping device does not include a motor nor a stuffing box, nor a lubrication system;
- the pumping device is wholly leakproof (no risk of contamination);
- the cost of this pumping device is very advantageous in comparison to those of the "slurry pumps" of the state of the art;
- the pumping device makes it possible to convey slurries containing hard and abrasive foreign bodies and various other constituents which cannot be tolerated by centrifugal pumps or screw pumps;
- this pumping device can convey thick slurries which have a relative density equal to or greater than 2.2 and which contain metal shot;
- the maintenance of a pumping device of this kind is straight forward and inexpensive; and
- compressed air usage, even though it depends on working conditions, remains economically advantageous.

I claim:

1. Intermittently operating pneumatic pumping device for a solid-carrying liquid or slurry and intended to be under a continuous load, and comprising:

a tubular body (1,31) defining an inner chamber with an entry port (15,45) and a delivery port (16,46) opening into the upstream and downstream ends, respectively, thereof;

at least one injection line for a compressed gas (18) opening into the inner chamber via at least one pressurization port (19);

a supply valve (20) connected to each injection line (18) and intended to be connected to a source of compressed gas (21) to provide a selective supply of compressed gas to each injection line (18); and a means of controlling (23) the supply valve (20); characterized in that the pumping device additionally comprises a single flap valve (12,42) mounted on a support (8,39) fixed inside the inner chamber, between the entry port and the pressurization port, and cooperating with a seat internal to the body, surrounding a passage port (11,41), for the solid-carrying liquid or slurry and defining, between it and the delivery port, a part of the inner chamber which constitutes a pumping chamber (17,47), the flap valve (12,42) pivoting, on[,] the one hand, towards the delivery port (16,46), in a position in which the pumping chamber is filling, in the absence of injection of compressed gas via the pressurization port (19) and under the pressure of the solid-carrying liquid or slurry which tends to enter the pumping chamber (17,47) through the passage port (11,41), and, on the other hand, in the opposite direction, towards the seat against which the valve (12,42) is applied in a leakproof manner in a position in which the pumping chamber (17,47) is closed upstream and is emptied downstream under the effect of an injection, via the pressurization port, of compressed gas which expels the volume of solid-carrying liquid held in the pumping chamber, out of the latter, via the delivery port, the lowest point of the pumping chamber in the region of the flap valve seat being at a level which is at least as high as the level of the highest point of the pumping chamber in the region of the delivery port, the pumping chamber (47) is defined in the tubular body (31) which consists of an upstream part in the shape of a cylindrical shell (32), into which a single injection line (18) opens via a single pressurization port (19), and which is extended in the downstream direction by a funnel (33), having substantially the shape of the frustum of a cone offset downwards, the upstream end of the cylindrical shell (32) of the body (31) has a flange (34) for coupling to a flange (38) at the downstream end of a filling pipeline (36) which opens into the cylindrical shell (32) defining the entry port (41) into the body (31), the flap valve (42) being supported by the downstream flange (38) of the filling pipeline (36), [and the downstream end of the funnel (33) being extended in the downstream direction by a delivery pipeline (48) incorporating means for coupling (49) to a delivery line,] the tubular body having an upstream section (36) forming a filling chamber (40) and a downstream section (31) forming the pumping chamber (47) and with the flap valve opening in [the lowest part of] the upstream portion (32) of this downstream section (31) whereas the compressed gas injection line (18) opens in the upper part of said upstream portion (32) through port (19) in a direction substantially transverse to the direction of travel of the solid-carrying liquid or slurry.

2. Pneumatic device according to claim 1, characterised in that the compressed gas supply valve (20) is a three-way valve, one of the channels of which permits the pumping chamber (17, 47) to be connected to the atmosphere by line (22) by means of the injection pipeline (18).

3. Pneumatic device according to claim 1, characterised in that a port for connecting the pumping chamber (17, 47) to the atmosphere is defined by the downstream end of a delivery line coupled to the outlet of the tubular body (1, 31).

4. Pneumatic device according to claim 1, characterised in that the flap valve (42') comprises a movable shutter (50) intended to be applied against the valve seat in a leakproof manner, as apron (52) for fixing to the support (39'), and a flexible part (56) connecting the shutter (50) to the apron (52) and forming a hinge permitting the pivoting of the shutter relative to the apron.

5. Pneumatic device according to claim 1, characterised in that the flap valve (42') comprises a rigid core (51) glued to or embedded in a plate (50) made of a rubbery material.

6. Pneumatic device according to claim 1 characterized in that it comprises flanges (34', 38') for attaching the tubular body downstream section to the tubular body upstream section and the attaching assembly comprising pivotable eyebolts with threaded stems cooperating with nuts and cavities provided on the flanges for removably fastening flange (34') at the upstream end of the tubular body downstream section (31) to flange (38') at the downstream end of tubular body upstream section (36), the said flange (34', 38') having several cavities (58) opening into their periphery and intended to be arranged facing each other on two adjacent flanges (34', 38') in order to receive, by pivoting the threaded stems (63) of the eyebolts (61) onto which the nuts (64) are screwed, and each of which pivots via its eye (62) around a shaft (6) carried by a yoke (59) projecting outwards over the part forming the body (31), the pipe (36) or the pipeline which carries one of the two adjacent flanges (34',38') to be assembled, so that the nut (64) can be clamped against the other adjacent flange.

7. Pneumatic device according to claim 1, characterised in that the means (23) for controlling the compressed gas supply valve (20) comprises a timing device which starts the filling and emptying cycles of the pumping chamber (17, 47).

* * * * *